US010394600B2

(12) United States Patent
Tao et al.

(10) Patent No.: US 10,394,600 B2
(45) Date of Patent: Aug. 27, 2019

(54) SYSTEMS AND METHODS FOR CACHING TASK EXECUTION

(71) Applicant: Capital One Services, LLC, McLean, VA (US)

(72) Inventors: Tao Tao, Jericho, NY (US); Santosh Bardwaj, Glen Allen, VA (US); Subodh Kumar, Glen Allen, VA (US); Brian Eugley, Richmond, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 278 days.

(21) Appl. No.: 15/393,018

(22) Filed: Dec. 28, 2016

(65) Prior Publication Data

US 2017/0185448 A1    Jun. 29, 2017

Related U.S. Application Data

(60) Provisional application No. 62/272,492, filed on Dec. 29, 2015.

(51) Int. Cl.
*G06F 9/46* (2006.01)
*G06F 9/48* (2006.01)
*H04L 29/08* (2006.01)
*G06F 9/50* (2006.01)

(52) U.S. Cl.
CPC .......... *G06F 9/4881* (2013.01); *G06F 9/5033* (2013.01); *G06F 9/5066* (2013.01); *H04L 67/04* (2013.01); *H04L 67/10* (2013.01); *H04L 67/2842* (2013.01); *H04L 67/32* (2013.01); *H04L 67/322* (2013.01); *H04L 67/327* (2013.01)

(58) Field of Classification Search
CPC ............................... G06F 9/4881; H04L 67/10
See application file for complete search history.

(56) References Cited

U.S. PATENT DOCUMENTS

| 5,774,668 A | * | 6/1998 | Choquier | ................ | G06F 9/505 |
| | | | | | 370/480 |
| 6,691,109 B2 | * | 2/2004 | Bjornson | .......... | G06F 17/30445 |
| 7,155,722 B1 | * | 12/2006 | Hilla | ........................ | G06F 9/505 |
| | | | | | 718/105 |

(Continued)

*Primary Examiner* — Adam Lee
(74) *Attorney, Agent, or Firm* — Finnegan, Henderson, Farabow, Garrett & Dunner LLP

(57) ABSTRACT

Certain disclosed embodiments provide improved systems and methods for processing jobs. The method comprises steps including receiving, from a client device over a network, information representing a job and generating at least two tasks representative of the job. The method further comprises, for each task, assigning, by a processor, a signature to the task representative of whether the task has been processed, determining at least one dataset related to the task, and assigning a signature to the determined at least one dataset. The method further comprises searching, by the processor, a data structure for the task signature, and based on the searching, sending the task over a network to a task executor for processing or locating results associated with the task. The method further comprises sending, over a network, a job result to the client device. Systems and computer-readable media are also provided.

17 Claims, 5 Drawing Sheets

(56) References Cited

U.S. PATENT DOCUMENTS

| | | | | |
|---|---|---|---|---|
| 7,735,084 B2* | 6/2010 | Nagano | ................... | H04L 29/06 709/226 |
| 7,757,236 B1* | 7/2010 | Singh | ................... | G06F 9/5083 709/224 |
| 7,761,462 B2* | 7/2010 | Bjornson | ............ | G06F 16/2474 707/764 |
| 7,886,299 B2* | 2/2011 | Kitamura | ................ | G06F 3/061 709/224 |
| 2003/0237096 A1* | 12/2003 | Barrett | .............. | G06F 17/30985 725/53 |
| 2005/0114318 A1* | 5/2005 | Dettinger | .............. | G06F 16/244 |
| 2005/0210469 A1* | 9/2005 | Chung | ................... | G06F 9/4843 718/100 |
| 2007/0143245 A1* | 6/2007 | Dettinger | ................... | G06F 16/248 |
| 2007/0271570 A1* | 11/2007 | Brown | ................... | G06F 9/5033 718/105 |
| 2008/0092140 A1* | 4/2008 | Doninger | .............. | G06F 9/5038 718/102 |
| 2008/0114939 A1* | 5/2008 | Mouton | .............. | G06F 12/0895 711/128 |
| 2008/0184232 A1* | 7/2008 | Clark | ................... | G06F 9/4812 718/100 |
| 2009/0012932 A1* | 1/2009 | Romem | ................... | G06F 11/18 |
| 2010/0095303 A1* | 4/2010 | Archer | ................... | G06F 9/505 718/105 |
| 2010/0107174 A1* | 4/2010 | Suzuki | ................... | G06F 9/5033 718/104 |
| 2010/0257229 A1* | 10/2010 | Bolohan | ................ | G06F 9/4843 709/203 |
| 2011/0197195 A1* | 8/2011 | Cai | ....................... | G06F 1/3203 718/102 |
| 2012/0124013 A1* | 5/2012 | Provenzano | ........ | G06F 16/1748 707/692 |
| 2012/0259969 A1* | 10/2012 | Mastrangelo | ....... | G06F 11/3419 709/224 |
| 2013/0031562 A1* | 1/2013 | Gusak | ................... | G06F 9/505 718/105 |
| 2013/0125133 A1* | 5/2013 | Schuster | ............... | G06F 9/5083 718/105 |
| 2014/0093175 A1* | 4/2014 | Morimoto | .......... | G06K 9/00221 382/195 |
| 2014/0195558 A1* | 7/2014 | Murthy | ............... | G06F 16/2471 707/770 |
| 2015/0026698 A1* | 1/2015 | Malakhov | ............ | G06F 9/5066 718/105 |
| 2015/0039682 A1* | 2/2015 | Chasman | ............ | H04L 67/2857 709/203 |
| 2015/0074679 A1* | 3/2015 | Fenoglio | ................. | G06F 9/505 718/104 |

\* cited by examiner

SYSTEMS AND METHODS FOR CACHING TASK EXECUTION

RELATED APPLICATIONS

This application claims priority to U.S. Provisional Patent Application No. 62/272,492, filed Dec. 29, 2015, of which the entire disclosure is incorporated herein by reference.

TECHNICAL FIELD

The disclosed embodiments generally relate to systems and methods for improvements upon cached job execution and re-execution.

BACKGROUND

Numerous computer software packages and techniques exist for executing tasks on computers. Throughout modern history, a computer scientist would translate a problem into machine-readable code (e.g., a programming language or a mathematical equation) and feed it to a single computer for execution. More recently, computers have been used in a distributed fashion. For example, a program may divide up a single task into several separate tasks and execute each task on a separate computer or "node." This can be more efficient when the individual tasks are independent of one another, and determining the result of the overall job requires only a simple combination of the results of each task.

For example, if a job is to "calculate the fastest route from zip code 07046 to zip code 22204," and the datasets for the computation include 30 days' worth of tracked trips (500,000 trips across 300,000 separate cars) between those two zip codes, the data may be easy to divide. One approach may be to divide the datasets into five parts, have five nodes compute the fastest route, and then compare the five fastest routes to determine the true fastest route.

But when tasks are dependent upon one another, or dependent upon particular datasets, completing the job can become complicated and may lead to inefficiencies if processed in a straightforward manner. For example, problems may arise when the fastest route must be calculated on a daily basis. Imagine that a first user requests the execution of the "calculate the fastest route for the past 30 days" job on a first day, and a second user requests that the job be performed again five days later. Other than five days' worth of data, the data associated with the first run of the job will be the same as the data used in the second run of the job. In processing the second run, it would be extremely inefficient to recalculate the fastest route for each of the 25 days that are used in both runs of the job. This causes slowdowns and increased node utilization, which means that new jobs cannot be processed in a timely manner.

These problems become amplified as the amount of information being processed and stored increases. Indeed, with the rapid developments in technology, the amount of available information has expanded at an explosive pace. At the same time, however, the demand for timely information derived from this massive amount of information has increased at a similar pace. Thus, as the ability to generate, collect, and store data continues to increase, it becomes exceedingly important to improve processing efficiencies to better take advantage of the higher processing speeds brought on by the "Big Data" era.

The disclosed embodiments address these and other problems with the prior art.

SUMMARY

In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

Certain disclosed embodiments provide improved systems and methods for processing jobs. The method comprises steps including receiving, from a client device over a network, information representing a job and generating at least two tasks representative of the job. The method further comprises, for each task, assigning, by a processor, a signature to the task representative of whether the task has been processed, determining at least one dataset related to the task, and assigning a signature to the determined at least one dataset. The method further comprises searching, by the processor, a data structure for the task signature, and based on the searching, sending the task over a network to a task executor for processing or locating results associated with the task. The method further comprises sending, over a network, a job result to the client device.

In accordance with additional embodiments of the present disclosure, a computer-readable medium is disclosed that stores instructions that, when executed by a processor(s), causes the processor(s) to perform operations consistent with one or more disclosed methods.

In accordance with additional embodiments of the present disclosure, a system is also disclosed that comprises at least one processor and at least one storage medium. The at least one storage medium comprises instructions that, when executed, causes the at least one processor to perform operations consistent with one or more disclosed methods.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Reference will now be made in detail to exemplary embodiments, examples of which are illustrated in the accompanying drawings and disclosed herein. Wherever convenient, the same reference numbers will be used throughout the drawings to refer to the same or like parts.

Organizations across numerous industries have come to recognize the value of making decisions based on new and useful information extracted from massive data sets previously too large and/or complex to analyze in an efficient and timely manner. To that end, embodiments of the present disclosure are usable to process tasks having many calculations. Example jobs that can be processed using these disclosed embodiments include any type of job that can be implemented in a mathematical or logical format. One example of such a job is determining a most efficient driving route between two points on a map using 30 days' worth of recorded trips between those points, collected from hundreds of mobile phone users. For example, a database may store every trip ever taken by a fleet of trucks, using telematics data recorded using devices installed in each truck in the fleet. Processing the job may require retrieving all trips that include the first and second points, selecting those trips that have occurred during the past 30 days, determining the fastest 10% of all of the selected trips, normalizing the fastest 10% of the selected trips to remove the effect of traffic, and outputting the fastest trip.

Another example of a job is determining the average (per transaction) amount spent by a subset of cardholders during the past three weeks. For example, a database may store card transactions from the past six months. The job may require retrieving all available transactions, selecting the transactions that were initiated by one of the subset of cardholders during the past three weeks, determining the value of each of those transactions, and finding the average value of the selected transactions.

Numerous other jobs may be processed using these embodiments, as these examples are for illustrative purposes only.

Figure 1:
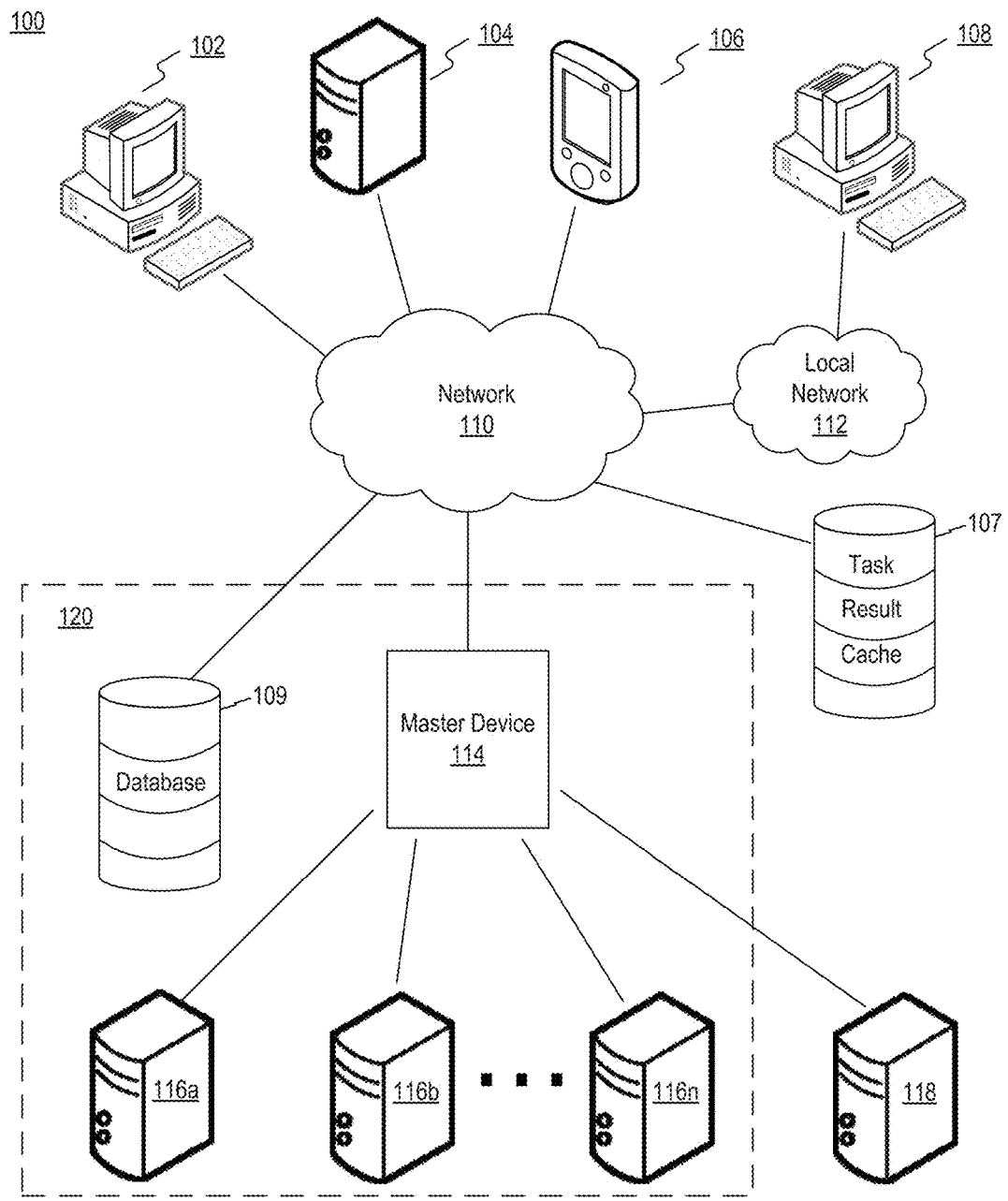
FIG. 1 is a block diagram of an exemplary system, consistent with disclosed embodiments.

FIG. 1 shows a diagram of an exemplary system 100, consistent with disclosed embodiments, revealing some technical aspects of the present disclosure for achieving the intended results of the present disclosure. System 100 may be implemented to, for example, improve computational efficiencies through cached job execution and re-execution of tasks associated with vast data stores, such as those found in "Big Data" applications.

As shown in FIG. 1, system 100 may include user devices 102, 104, 106, and 108, a task result cache 107, a database 109, a network 110, a local network 112, a master device 114, local task executor servers 116a-116n, and a remote task executor server 118. The components and arrangement of the components included in system 100 may vary. Thus, system 100 may further include other components or devices that perform or assist in the performance of one or more processes consistent with the disclosed embodiments. The components and arrangements shown in FIG. 1 are not intended to limit the disclosed embodiments, as the components used to implement the disclosed processes and features may vary.

As depicted in FIG. 1, user devices 102, 104, 106, and 108 may be implemented using a variety of different equipment, such as supercomputers, personal computers, servers, mainframes, mobile devices, smartphones, tablets, thin clients, or the like. User devices 102, 104, 106, and 108 may be connected to a network such as network 110 or local network 112. In some embodiments, user devices 102, 104, 106, and 108 may be configured to generate information relating to a job. The job may be, for example, a computer-implemented task that requires the use of large amounts of data (e.g., thousands or millions of records in a database). A user may input the job into one of user devices 102, 104, 106, or 108 by translating the job into a programming or notation language (e.g., Java, Python, Scala, R, or the like), using a graphical user interface (e.g., to create a graphical representation of the job), or using another method. User devices 102, 104, 106, or 108 may send that inputted job to master device 114 for processing.

Network 110, in some embodiments, may comprise one or more interconnected wired or wireless data networks that receive data from one device (e.g., user device 102) and send it to another device (e.g., master device 114). For example, network 110 may be implemented as the Internet, a wired Wide Area Network (WAN), a wired Local Area Network (LAN), a wireless LAN (e.g., IEEE 802.11, Bluetooth, etc.), a wireless WAN (e.g., WiMAX), or the like. Local network 112 may be implemented in a similar manner and may be connected to network 110.

Example FIG. 1 depicts only particular devices being connected to network 110. In some embodiments, more or fewer devices may be connected to network 110 and/or local network 112.

Master device 114 may be implemented using a variety of different equipment, such as one or more supercomputers, one or more personal computers, one or more servers, one or more mainframes, one or more mobile devices, one or more smartphones, one or more tablets, one or more thin clients, or the like. In some embodiments, master device 114 may comprise hardware, software, or firmware modules. The modules may be configured to receive information representing a job from one of user devices 102, 104, 106, or 108, divide the job into at least one task, schedule the tasks, determine which of task executors 116a-116n or 118 should perform each task, send the tasks to at least one of task executors 116a-116n, receive task results from task executors 116a-116n, combine the task results, and return a job result based on the task results to user devices 102, 104, 106, or 108.

Task result cache 107 may be implemented as one or more databases that store data related to completed tasks. Task result cache 107 may be implemented as a standalone database, a distributed database, or any other kind of database. In some embodiments, task result cache 107 may store task results (e.g., the results of processing one or more tasks) in a structure such as a directed acyclic graph (DAG). An example DAG is described below with respect to FIG. 3. DAGs may specify how a task result is calculated or determined. This enables master device 114 (or another device) to recalculate the task result in case the result is not present.

Database 109 may be implemented as one or more databases configured to store datasets. The datasets, in some embodiments, relate to data that is usable in processing a job submitted by one of user devices 102, 104, 106, or 108. For example, database 109 may include GPS data from trips made by a fleet of trucks, transaction data for a credit card company, phone call metadata (e.g., information on calls between two or more telephones), social network interactions, user-uploaded photos, searches submitted to a search engine, sensor data, music playback data, or the like. Database 109 may be implemented using document management systems, Microsoft SQL databases, Share Point databases, Oracle™ databases, Sybase™ databases, or other relational databases, or non-relational databases such as key-value stores or NoSQL databases such as Apache HBase™. In some embodiments, database 109 may comprise an associative array architecture, such as a key-value storage, for storing and rapidly retrieving large amounts of information.

Each of task executors 116a-116n and 118 may be implemented using a variety of different equipment, such as a supercomputer, personal computer, a server, a mainframe, a mobile device, a smartphone, a tablet, a thin client, or the like. Task executors 116a-116n may be located in the same data center or a localized system 120, whereas task executor 118 may be located in a different physical location (e.g., connected to master device 114 and/or task executors 116a-116n using a leased line, private link, or public connection).

Figure 2:
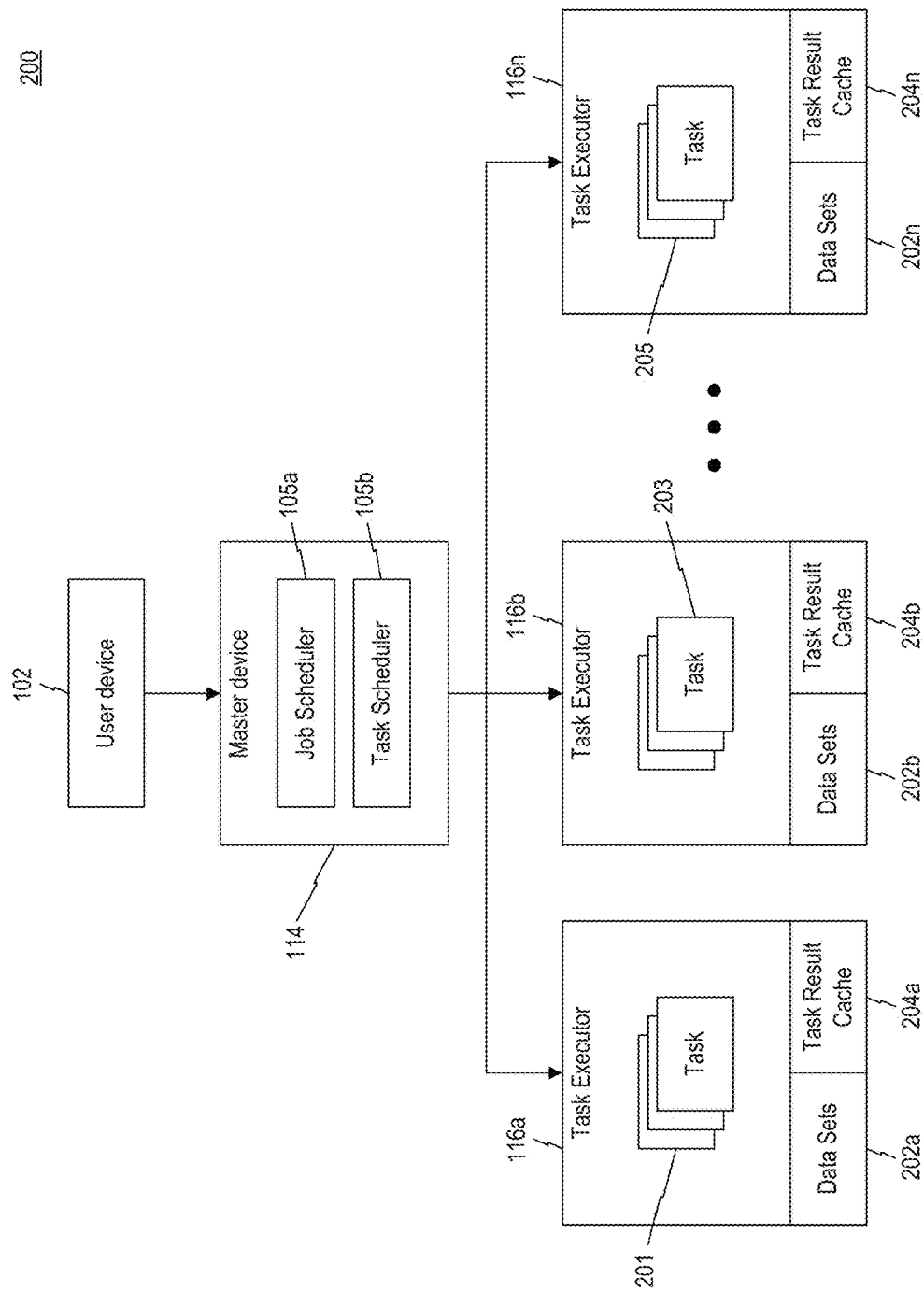
FIG. 2 is a block diagram of an exemplary data flow, consistent with disclosed embodiments.

FIG. 2 shows a diagram of an exemplary data flow 200, consistent with disclosed embodiments. Data flow 200 depicts client device 102, master device 114, and task executors 116a-116n. As explained above with respect to FIG. 1, each of these devices may be implemented as one or more electronic devices (e.g., supercomputer, personal computers, servers, mainframes, computer clusters, mobile devices, or thin clients). Additionally, while FIG. 1 represents the Task Result Cache 107 as a separate device accessible by each of task executors 116a-116n and 118, FIG. 2 depicts each task executor 116a-116n as having an individual task result caches 204a-204n. This may be in addition to a separate task result cache 107 (not pictured in FIG. 2) that stores information indicating which of task result caches 204a-204n stores a particular DAG or other information.

In exemplary data flow 200, user device 102 may generate a job. For example, user device 102 may generate a job whose output is the average (per transaction) amount spent by a subset of cardholders during the past three weeks. Each job may be associated with one or more datasets that are needed or useful for performing the job. For example, if the job requires the determination of the average value of a series of credit card transactions over a 30-day period, the datasets may comprise one or more sets of card transactions. One of the sets may be for all credit cards, while another set may be for all debit cards.

In some embodiments, each job may be associated with a value. The value may represent, for example, a priority level or a monetary value of the job. In some embodiments, the value may be associated with the job for reference purposes, while in other embodiments, the value may be utilized in processing the job or stores a task result related to the job. For example, modules in master device 114 (e.g., job scheduler 105a or task scheduler 105b) may process the job differently based on the value, or may prioritize requesting task executors 116a-116n to process a job a higher value than other jobs. As another example, task result cache 107 and/or task result caches 204a-204n may be configured to clear out task results that are associated with a low value (e.g., the lowest of all task results stored in task result caches 204a-204n). For example, if a task result cache 204a is nearing capacity, it may erase task results having low business values, until task result cache 204a is able to store more task results.

User device 102 may send one or more jobs (e.g., in the form of a programming language such as Java or Scala) to master device 114. Master device 114 may receive a job from user device 102. Job scheduler 105a may divide the received job into one or more tasks. For example, job scheduler 105a may receive a job from user device 102. Job scheduler 105a may divide the job into tasks that are computable by different task executors in parallel. For example, if the job requires the determination of the average value of a series of credit card transactions over a 30-day period, job scheduler 105a may determine that there are 150,000 transactions, and may divide the transactions into three separate tasks (e.g., the first 50,000, the second 50,000, and the final 50,000).

Job scheduler 105a may also create signatures for each DAG. Job scheduler 105a may create the signature by, for example, determining a one-time signature for the DAG. One example method of calculating this signature is described in "Directed Acyclic Graphics, One Way Functions and Digital Signatures," by Bleichenbacher and Maurer (1994).

The signature may be used in a data structure such as a directed acyclic graph that relates each task to the underlying datasets. As one example, a job relates to calculating the likelihood that a user having a social network will click on a particular advertisement from an advertiser. The job may determine this likelihood as:

$$p(\text{click}) = \omega_1 * \sum_{i=1}^{n} \text{clicks}_{12_i} + \omega_2 * \sum_{j=1}^{m} \text{clicks}_{12_j} + \omega_3 * \sum_{k=1}^{q} \text{clicks}_{24_k}$$

where $\Sigma_{i=1}^{n} \text{clicks}_{12_i}$ represents a number of clicks by all users on all advertisements in the previous 12 hours, $\Sigma_{j=1}^{m} \text{clicks}_{12_j}$ represents a number of clicks by users within two degrees of that user (e.g., a friend of a friend on the social network) on all advertisements from the advertiser in the previous 12 hours, and $\Sigma_{k=1}^{q} \text{clicks}_{24_k}$ represents a number of clicks by users within one degree of that user on all advertisements from the advertiser in the previous 24 hours, and $\omega_1$, $\omega_2$, and $\omega_3$ each represent different weight values between 0.0 and 1.0. These clicks may be based on, for example, information stored in web server log files, advertisement system log files, or the like.

Determining each of these values can be computationally intensive but may involve similar calculations. For example, the determination of a number of clicks by all users (i.e., $\Sigma_{i=1}^{n} \text{clicks}_{12_i}$) will necessarily calculate all of the clicks related to the second-degree connections (i.e., $\Sigma_{j=1}^{m} \text{clicks}_{12_j}$) and a portion of the clicks for the first-degree connections (i.e., $\Sigma_{k=1}^{q} \text{clicks}_{24_k}$). Job scheduler 105a may determine that calculating the clicks for the second-degree connections and the clicks for the first-degree connections will depend in part upon calculating the clicks for all users. Job scheduler 105a may assign a first signature to the weighted number of clicks by all users (i.e., $\Sigma_{i=1}^{n} \text{clicks}_{12_i}$), a second signature to the weighted number of clicks by the second-degree connections (i.e., $\Sigma_{j=1}^{m} \text{clicks}_{12_j}$), and a third signature to the weighted number of clicks by the first-degree connections (i.e., $\Sigma_{k=1}^{q} \text{clicks}_{24_k}$). Each signature may comprise, for example, data representing each individual portion of the job. Job scheduler 105a may also link signatures together based on these dependencies. For example, job scheduler 105a may insert the signatures into a data structure such as a DAG that represents the dependency of each signature. The insertion of the signatures into such a structure enables the system to avoid recalculating data. Other data may be inserted into such a data structure, such as a value associated with a job. For example, as explained above, each job may have a value. The value of a job may be stored in association with a task signature whose task is associated with the job.

Job scheduler 105a may send instructions about each task to task scheduler 105b, such as an instruction to calculate the average value of each subset of transactions. Job scheduler 105a may also send signatures related to each task to task scheduler 105b. For example, job scheduler 105b may send a signature associated with each task and a signature associated with each dataset that relates to each task to task scheduler 105b.

Task scheduler 105b may receive the information about each task from job scheduler 105a. Continuing the above example, task scheduler 105b may receive information indicating tasks, such as a) calculating a number of clicks by all users on all advertisements in the previous 12 hours ($\Sigma_{i=1}^{n}$ clicks$_{12_i}$), b) calculating a number of clicks by users within two degrees of that user on all advertisements from the advertiser in the previous 12 hours ($\Sigma_{j=1}^{m}$ clicks$_{12_j}$), c) calculating a number of clicks by users within one degree of that user on all advertisements from the advertiser in the previous 24 hours ($\Sigma_{k=1}^{q}$ clicks$_{24_k}$), and d) multiplying each calculated number of clicks by a different weight ($\omega_1$, $\omega_2$, $\omega_3$). Task scheduler 105b may determine whether a task result cache (e.g., task result cache 107 or one of task result caches 204a-204n) contains a signature that relates to one of the received tasks.

For example, if task scheduler 105b receives a task requiring the calculation of a number of clicks by users within two degrees of a user on all advertisements from the advertiser in the previous 12 hours ($\Sigma_{j=1}^{m}$ clicks$_{12_j}$), task scheduler 105b may determine whether or not a task result cache stores a signature associated with that task by computing a task result signature and searching for that task result signature in one or more task result caches 204a-204n or task result cache 107. For example, task scheduler 105b may determine whether a signature relating to the dataset of clicks from all users (e.g., $\Sigma_{i=1}^{n}$ clicks$_{12_i}$) exist in the task result cache, and then whether a signature relating to the dataset of clicks by second-degree users ($\Sigma_{j=1}^{m}$ clicks$_{12_j}$) exist in the task result cache.

If task scheduler 105b determines that one or more datasets or tasks have not been processed (e.g., because task scheduler 105b determines that there is no corresponding signature in a task result cache), task scheduler 105b may send the corresponding task to one of task executors 116a-116n for execution. In some embodiments, determining which task executor to send the task to may be based on the load of each task executor (e.g., how much processor time is being used), based on a value associated with the task, or the like. For example, if task scheduler 105a determines that a first task is associated with a higher value than a second task (e.g., because the first task's job has a higher associated value than the second task's job), task scheduler 105b may determine to send the first task to an under-utilized task executor 116a and send the second task to a task executor 116b that is currently processing other tasks.

Figure 3:
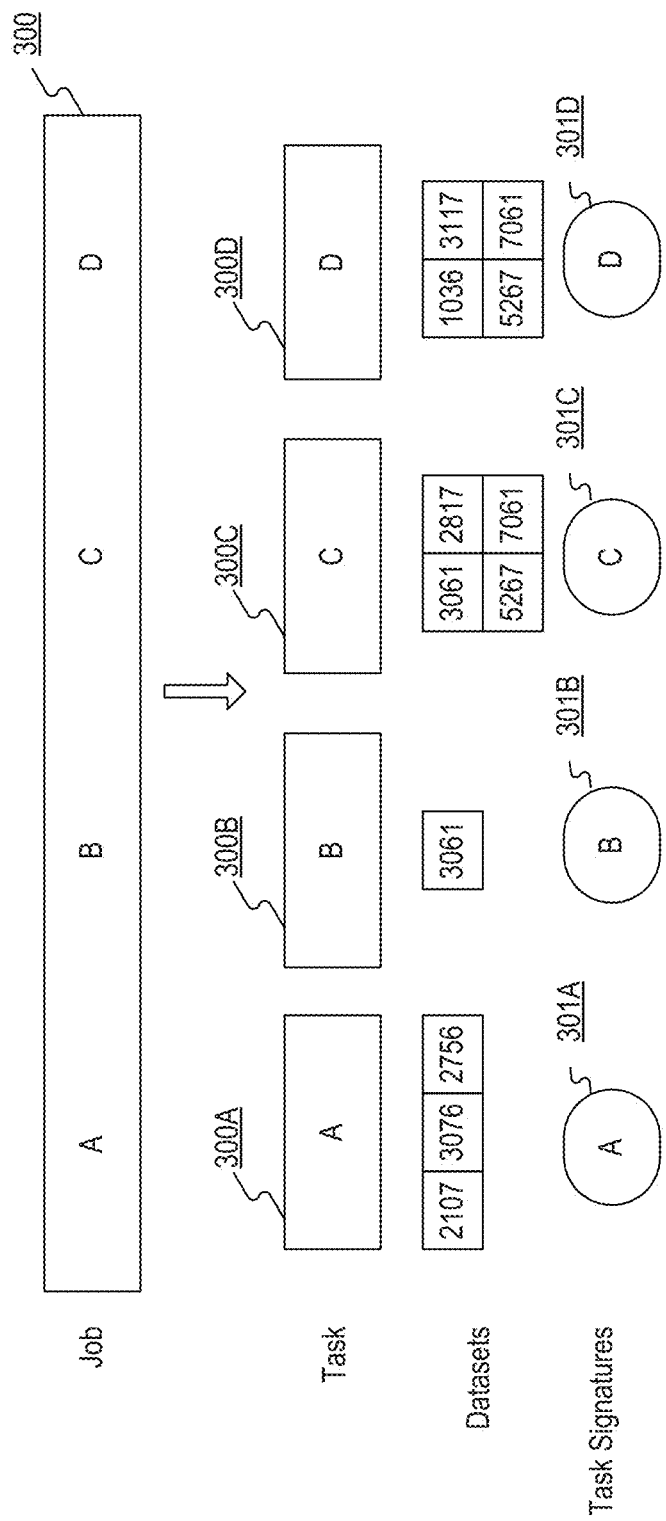
FIG. 3 is a block diagram of an exemplary job and its related component parts, consistent with disclosed embodiments.

FIG. 3 is a block diagram of an exemplary job 300 and its related component parts, consistent with disclosed embodiments. Job 300 is represented as a single item. Job 300 is made up of four tasks 300A-300D. Each task 300A-300D is associated with a task signature 301A-301D. The task signatures 301A-301D are representative of whether the corresponding task 300A-300D, respectively, has been processed. As one example, task 300A may represent "determining the longest duration that any one user spent on a website yesterday." If a task executor 116a processes task 300A at 11:30 am EST on Tuesday, corresponding task signature 301A may be valid until 11:59 pm EST on Tuesday, and may become "invalid" starting at 12:00 am EST Wednesday.

Task signatures may also be used to signify whether a particular task has been performed without taking into account the timing of the task. As one example, job 300 may represent a command to "determine the highest point in a mountain range" given a set of GPS coordinates and altimeter readings corresponding to the set of GPS coordinates. Task 300A may comprise converting GPS coordinates from one form to another form, which may involve using formulas, tables, or previous measurements. Task 300B may comprise converting altimeter readings from one form to another form, such as from a pressure measurement to offset data (e.g., in meters). Task 300C may comprise reading map data from a known source, such as the United States Geological Survey (USGS) and converting it to a form that can be utilized by a formula and/or modified using offset data. In this example, it is unlikely that the results of task 300C would change from day to day, so corresponding task signature 301C may represent whether or not the map data has been converted from one form to another. (One of ordinary skill will be able to come up with numerous other examples for which task results may be time-sensitive or time-insensitive.)

Signatures 301A-301D may also signify whether or not particular tasks have cached data associated with the corresponding tasks. Taking the above example where task 300A comprises converting GPS coordinates from one form to another form, the existence of task signature 301A may indicate that a task result cache stores the converted GPS coordinates as well. For example, if a task result cache stores a valid task signature, that signifies that the task result cache also stores the result of the task after it was processed.

So, for example, if a task result cache stores task signatures 301A, 301B, 301C, this means that task scheduler 105b may determine that task 300D needs to be processed by a task executor, and that the underlying datasets (1036, 3117, 5267, and 7061) need to be processed and/or updated by a task executor because the task result cache does not include task signature 301D. Task scheduler 105b may then send task 300D to a task executor (e.g., task executor 116a) for execution.

Figure 4:
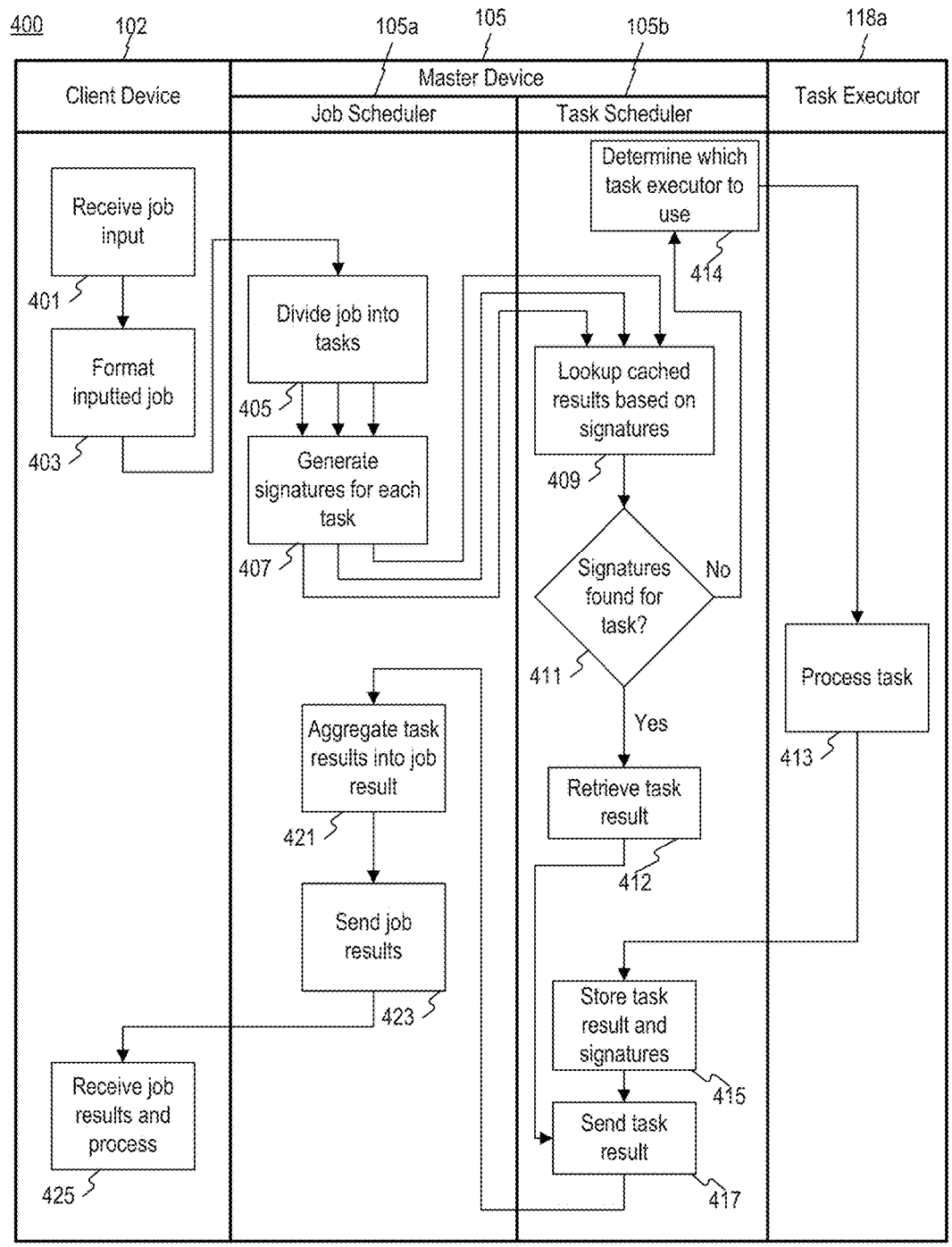
FIG. 4 is a flowchart of an exemplary process for processing a job, consistent with disclosed embodiments.

FIG. 4 is a flowchart of an exemplary process 400 for processing a job, consistent with disclosed embodiments. Process 400 starts at step 401. In step 401, a user may input a job specification into a client device such as client device 102. For example, the user may utilize a GUI to create a specification for the job that the user desires to have performed. The user may also input the job specification by translating it to a programming or notation language (e.g., Java, Python, Scala, R, or the like). A particular method of job input—e.g., programming language, scripting language, declarative vs. imperative language—is not required as any type of job input methodology may be used. In step 403 is optional, if the user inputs a job specification using a GUI, the GUI may translate the job specification to a programming language. Step 403 may also represent client device 102 sending the job to job scheduler 105a.

In step 405, job scheduler 105a may divide the job into one or more tasks for processing by task executors 116a-116n. For example, job scheduler 105a may divide the job into tasks based on the size of the data that must be processed for the job. As one example, if the job is to "calculate the average transaction amount for a set of 150,000 transactions," job scheduler 105a may divide that job into three separate tasks of determining the average transaction amount of 50,000 distinct transactions.

In step 407, job scheduler 105a may generate a signature corresponding to each task. One example method of calculating this signature is described in "Directed Acyclic Graphics, One Way Functions and Digital Signatures," by Bleichenbacher and Maurer (1994). Job scheduler 105a may send the tasks and corresponding signatures to task scheduler 105b.

In step 409, task scheduler 105b may receive the tasks and corresponding signatures from job scheduler 105a. Task scheduler 105b may search for the received task signatures in a task result cache (e.g., task result cache 107, 204a, 204b, or 204n). In searching for the task signatures in the task result cache, task scheduler 105b may also determine which datasets relate to the received task and determine whether the task result cache that stores the task signature also contains signatures corresponding to those datasets. For example, task result cache 107 may store the task signatures in a structure such as a directed acyclic graph (DAG). Task scheduler 105b may locate the task signature in the DAG to determine the data associated with the task signatures.

Step 411 comprises a determination of whether a signature was found for each task and/or dataset associated with the job submitted by the user. Using FIG. 3 as an example, if task scheduler 105b is able to locate task signature 301B (corresponding to task 300B) in task result cache 107 but cannot locate task signature 301C, task scheduler 105b may determine that the results of task 300C corresponding to task signature 301C may not be stored in task result cache 107. Task scheduler 105b may then determine that a task executor must process task 300C.

If task scheduler 105b determines that a task result is cached in task result cache 107, process 400 may proceed to step 412 where task scheduler 105b can retrieve the cached result from task result cache 107 (e.g., by submitting a query to task result cache 107). In step 417, task scheduler 105b may send the task result to job scheduler 105a.

If, however, task scheduler 105b determines that a task result is not cached in task result cache 107, process 400 may proceed to step 414 where task scheduler 105b may determine which task executor should process the task. In step 414, task scheduler 105b may determine which task executor should process the task based on, for example, a value associated with the task. This value, as explained above, may represent, for example, a priority level or a monetary value of the job associated with the task. In some embodiments, the value may be associated with the job for reference purposes, while in other embodiments, the value may be utilized in determining how to process the job. For example, the value may represent a monetary value associated with processing the job. Task scheduler 105b may determine which task executor should execute a particular task based on the value. For example, task scheduler 105b may send a high-value task to a task executor that is currently idle (e.g., not processing any tasks) and send a low-value task, such as one associated with a different job, to a task executor that is currently processing multiple other tasks.

After determining which task executor to use, task scheduler 105b may send information about the task (e.g., a description of the task or instructions for performing the task) to the selected task executor.

In step 413, task executor 118a receives the task and processes it. For example, if the received task comprises a calculation of the average value of 50,000 credit card transactions, step 413 may comprise retrieving each transaction from a database (e.g., database 109), determining a value of each transaction, summing the value of each transaction, and dividing the summed value by the number of transactions. Task executor 118a may send the result of the task processing to task scheduler 105b.

In step 415, task scheduler 105a may receive the result of the task processing in step 413 and store it in a task result cache. Task scheduler 105a may also store the relevant signatures associated with the task result (e.g., the task signature and any value(s) associated with the task) in a task result cache such as task result cache 107. In step 417, task scheduler 105a may send the task result to job scheduler 105a.

Figure 5:
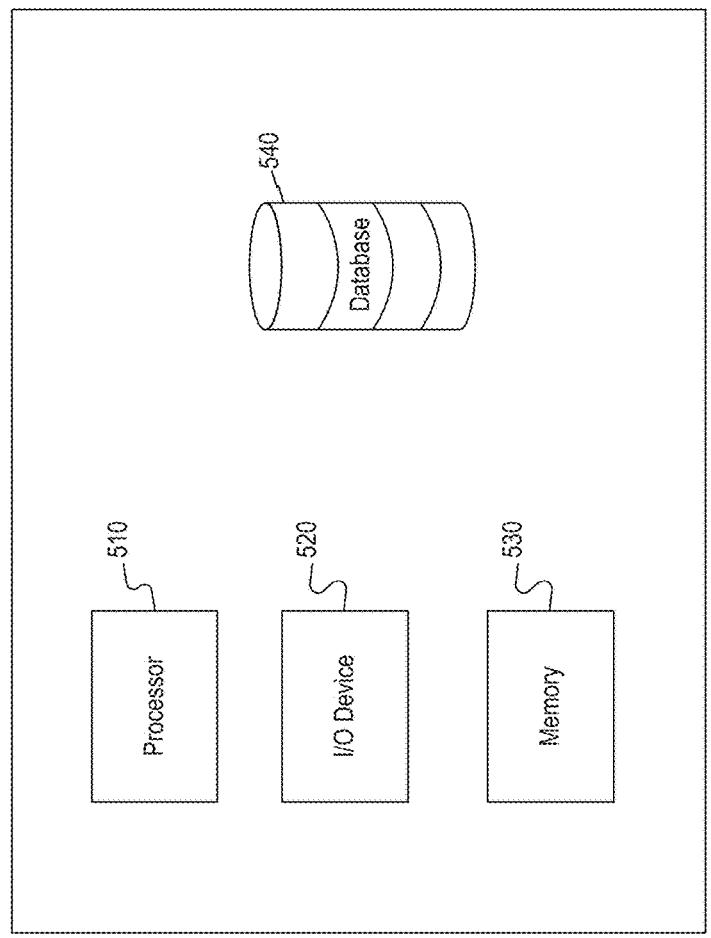
FIG. 5 is a block diagram of an exemplary computing system, consistent with disclosed embodiments.

FIG. 5 is a block diagram of an exemplary computing system 500, consistent with disclosed embodiments. For example, one or more components of system 100 may comprise exemplary computer system 500 or variants thereof. System 500 may include one or more processors 510, one or more memories 530, and one or more input/output (I/O) devices 520. In some embodiments, system 500 may take the form of a supercomputer, server, general-purpose computer, a mainframe computer, laptop, smartphone, mobile device, or any combination of these components. In certain embodiments, computing system 500 (or a system including computing system 500) may be configured as a particular apparatus, system, and the like based on the storage, execution, and/or implementation of the software instructions that cause a processor to perform one or more operations consistent with the disclosed embodiments. Computing system 500 may be standalone, or it may be part of a subsystem, which may be part of a larger system.

Processor 510 may include one or more known processing devices, such as a microprocessor from the Pentium™ or Xeon™ family manufactured by Intel™, the Turion™ family manufactured by AMD™, or any of various processors manufactured by Sun Microsystems. Processor 510 may constitute a single-core or multiple-core processor that executes parallel processes simultaneously. For example, processor 510 may be a single-core processor configured with virtual processing technologies. In certain embodiments, processor 510 may use logical processors to simultaneously execute and control multiple processes. Processor 510 may implement virtual machine technologies, or other known technologies to provide the ability to execute, control, run, manipulate, store, etc. multiple software processes, applications, programs, etc. In another embodiment, processor 510 may include a multiple-core processor arrangement (e.g., dual, quad core, etc.) configured to provide parallel processing functionalities to allow computing system 500 to execute multiple processes simultaneously. One of ordinary skill in the art would understand that other types of processor arrangements could be implemented that provide for the capabilities disclosed herein. The disclosed embodiments are not limited to any type of processor(s) configured in computing system 500.

Memory 530 may include one or more storage devices configured to store instructions used by processor 510 to perform functions related to the disclosed embodiments. For example, memory 530 may be configured with software instructions, such as program(s) that perform one or more operations when executed by processor 510. The disclosed embodiments are not limited to separate programs or computers configured to perform dedicated tasks. For example, memory 530 may include a program that performs the functions of computing system 500, or a program that comprises multiple programs. Additionally, processor 510 may execute one or more programs located remotely from computing system 500. Processor 510 may further execute one or more programs located in database 540. In some embodiments, programs may be stored in an external storage device, such as a cloud server located outside of computing system 500, and processor 510 may execute such programs remotely.

Memory 530 may also store data that may reflect any type of information in any format that the system may use to perform operations consistent with the disclosed embodiments. Memory 530 may store instructions to enable processor 510 to execute one or more applications, such as server applications, an authentication application, network communication processes, and any other type of application or software. Alternatively, the instructions, application programs, etc., may be stored in an external storage (not shown) in communication with computing system 500 via network 110 or any other suitable network. Memory 530 may be a volatile or non-volatile, magnetic, semiconductor, tape, optical, removable, non-removable, or other type of storage device or tangible (i.e., non-transitory) computer-readable medium. For example, memory 530 may include one or more data structures, task signatures, or cached task results.

I/O devices 520 may be one or more device that is configured to allow data to be received and/or transmitted by computing system 500. I/O devices 520 may include one or more digital and/or analog communication devices that allow computing system 500 to communicate with other machines and devices, such as other components of system 100 shown in FIG. 1. For example, computing system 500 may include interface components, which may provide interfaces to one or more input devices, such as one or more keyboards, mouse devices, and the like, which may enable computing system 500 to receive input from an operator of, for example, user devices 102, 104, 106, and 108.

Computing system 500 may also contain one or more database(s) 540. Alternatively, as explained above with respect to FIG. 1, computing system 500 may be communicatively connected to one or more database(s) 540. Computing system 500 may be communicatively connected to database(s) 540 through network 110 and/or local network 112. Database 540 may include one or more memory devices that store information and are accessed and/or managed through computing system 500. By way of example, database(s) 540 may include Oracle™ databases, Sybase™ databases, or other relational databases or non-relational databases, such as Hadoop sequence files, HBase, or Cassandra. The databases or other files may include, for example, data and information related to the source and destination of a network request and the data contained in the request, etc. Systems and methods of disclosed embodiments, however, are not limited to separate databases. Database 540 may include computing components (e.g., database management system, database server, etc.) configured to receive and process requests for data stored in memory devices of database(s) 540 and to provide data from database 540.

In some aspects, user devices 102, 104, 106, and 108, task result cache 107, database 109, network 110, local network 112, master device 114, local task executor servers 116a-116n, and/or remote task executor server 118, may include the same or similar configuration and/or components of computing system 500.

In some examples, some or all of the logic for the above-described techniques may be implemented as a computer program or application or as a plugin module or sub component of another application. The described techniques may be varied and are not limited to the examples or descriptions provided. In some examples, applications may be developed for download to mobile communications and computing devices, e.g., laptops, mobile computers, tablet computers, smart phones, etc., being made available for download by the user either directly from the device or through a website.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those of skill in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead are defined by the appended claims in light of their full scope of equivalents.

What is claimed is:

1. A method for processing a job in a form of computer-executable code, comprising:
   receiving, at a client device over a network, information representing the job;
   receiving the job at a job scheduler of a master device;
   dividing, by the job scheduler, the job into at least two tasks comprising a first task and a second task;
   for the first task:
   generating, by the job scheduler, a signature corresponding to the first task representative of whether the first task has been processed;
   searching, by a task scheduler of the master device, a data structure for the generated signature;
   if the signature is found in the data structure retrieving a result associated with the first task by the task scheduler;
   if the signature is not found in the data structure,
   sending the first task by the task scheduler over the network to a task executor device,
   processing the first task by the task executor device,
   receiving a result of the first task processing by the task scheduler, and
   storing the task result and a signature corresponding to the processed first task in the data structure by the task scheduler;
   aggregating, by the job scheduler, the task result into a job result;
   sending, by the job scheduler and over the network, the job result to the client device; and
   processing the job result by the client device.

2. The method of claim 1, wherein the data structure comprises a Directed Acyclic Graph (DAG).

3. The method of claim 1, wherein the data structure comprises: a first node comprising a task signature associated with the first task.

4. The method of claim 1, further comprising:
determining a dataset related to one or more tasks.

5. The method of claim 1, wherein sending the first task to a task executor device further comprises:
determining a value associated with the first task;
determining amounts of processor load for a plurality of task executor devices;
selecting one of the task executor devices based upon the determined value and the determined amounts of processor load; and
sending the first task to the selected task executor device.

6. The method of claim 5, wherein the at least two tasks are processed by different task executor devices in parallel.

7. A system, comprising:
a memory device storing instructions to implement the method of claim 1; and
at least one processor, configured to execute the instructions.

8. The system of claim 7, wherein the data structure comprises a Directed Acyclic Graph (DAG).

9. The system of claim 7, wherein the data structure comprises a first node comprising a task signature associated with the first task.

10. The system of claim 7, further comprising:
determining a dataset related to one or more tasks.

11. The system of claim 7, wherein sending the first task to a task executor device further comprises:
determining a value associated with the first task;
determining amounts of processor load for a plurality of task executor devices;
selecting one of the task executor devices based upon the determined value and the determined amounts of processor load; and
sending the first task to the selected task executor device.

12. The system of claim 11, wherein the at least two tasks are processed by different task executor devices in parallel.

13. A non-transitory computer-readable medium comprising instructions that, when executed by at least one processor, cause the at least one processor to perform the method of claim 1.

14. The non-transitory computer-readable medium of claim 13, wherein the data structure comprises a Directed Acyclic Graph (DAG).

15. The non-transitory computer-readable medium of claim 13, wherein the data structure comprises a first node comprising a task signature associated with the first task.

16. The non-transitory computer-readable medium of claim 13, further comprising: determining a dataset related to one or more tasks.

17. The non-transitory computer-readable medium of claim 13, wherein sending the first task to a task executor device further comprises:
determining a value associated with the first task;
determining amounts of processor load for a plurality of task executor devices;
selecting one of the task executor devices based upon the determined value and the determined amounts of processor load; and
sending the first task to the selected task executor device.

* * * * *